(12) United States Patent
Tseng

(10) Patent No.: US 9,746,015 B2
(45) Date of Patent: Aug. 29, 2017

(54) FLOATING FASTENER MOUNTING STRUCTURE

(71) Applicant: HANWIT PRECISION INDUSTRIES LTD., New Taipei (TW)

(72) Inventor: Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 282 days.

(21) Appl. No.: 14/716,218

(22) Filed: May 19, 2015

(65) Prior Publication Data

US 2015/0247517 A1    Sep. 3, 2015

Related U.S. Application Data

(63) Continuation-in-part of application No. 14/614,983, filed on Feb. 5, 2015, now Pat. No. 9,347,471, which is a continuation of application No. 13/607,759, filed on Sep. 9, 2012, now abandoned.

(51) Int. Cl.
  *F16B 21/18* (2006.01)
  *F16B 21/02* (2006.01)
  *F16B 5/02* (2006.01)

(52) U.S. Cl.
  CPC ............ *F16B 21/02* (2013.01); *F16B 5/0208* (2013.01); *Y10T 29/49948* (2015.01)

(58) Field of Classification Search
  USPC .................. 411/132, 180, 347, 349, 353
  See application file for complete search history.

(56) References Cited

U.S. PATENT DOCUMENTS

| | | | |
|---|---|---|---|
| 3,180,389 A | 4/1965 | Charles | |
| 5,251,370 A | 10/1993 | Muller et al. | |
| 5,335,411 A | 8/1994 | Muller et al. | |
| 5,382,124 A | 1/1995 | Frattarola | |
| 5,544,992 A * | 8/1996 | Ciobanu | H05K 7/1407 411/107 |
| 5,851,095 A | 12/1998 | Ellis et al. | |
| 6,238,155 B1 | 5/2001 | Aukzemas et al. | |
| 6,280,131 B1 | 8/2001 | Ellis et al. | |
| 6,468,012 B2 | 10/2002 | Ellis et al. | |

(Continued)

*Primary Examiner* — Roberta Delisle
(74) *Attorney, Agent, or Firm* — Muncy, Geissler, Olds & Lowe, P.C.

(57) ABSTRACT

A floating fastener mounting structure includes a mounting socket having a locating groove extending around the periphery and defined between a relatively smaller annular step and a relatively larger stop flange thereof, a metal panel member having a mounting through hole attached to the mounting socket and stopped above the stop flange and stamped by a stamping press to provide a riveting portion and to force the riveting portion to engage into the locating groove and to wrap about the stop flange of the mounting socket, a spring-loaded locking member axially slidably mounted in the mounting socket for detachably locking the metal panel member to an external metal panel member, and a cap member capped on a mounting head of the locking member and affixed to the mounting head during the operation of the stamping press to stamp the metal panel member. Affixing the mounting socket to the metal panel member by riveting greatly enhances the shearing strength of the floating fastener mounting structure.

8 Claims, 10 Drawing Sheets

(56) References Cited

U.S. PATENT DOCUMENTS

| | | |
|---|---|---|
| 6,722,052 B2 | 4/2004 | Wu |
| 7,905,696 B2 | 3/2011 | Chiu |
| 7,922,432 B2 * | 4/2011 | Chiu .................... F16B 5/0208 411/107 |
| 7,938,607 B2 | 5/2011 | Wang |
| 8,066,461 B2 | 11/2011 | Travers |
| 8,087,861 B2 | 1/2012 | Wang |
| 8,371,786 B2 | 2/2013 | Chiu |
| 8,388,288 B2 | 3/2013 | Chiu |
| 8,393,840 B2 * | 3/2013 | Chiu .................... F16B 5/0208 411/353 |
| 8,827,614 B2 | 9/2014 | Tseng |
| 8,939,691 B2 * | 1/2015 | Tseng .................... F16B 21/04 411/347 |
| 2004/0165966 A1 * | 8/2004 | Aukzemas ............ F16B 5/0208 411/353 |
| 2005/0053446 A1 * | 3/2005 | Huang .................. F16B 5/0208 411/396 |
| 2006/0137166 A1 | 6/2006 | Babej et al. |
| 2009/0202319 A1 * | 8/2009 | Wang .................... F16B 5/0208 411/353 |
| 2009/0313804 A1 * | 12/2009 | Wang .................... F16B 5/0208 29/525.11 |
| 2010/0290861 A1 | 11/2010 | Wang |
| 2011/0070049 A1 * | 3/2011 | Wang .................... F16B 5/0208 411/372.6 |
| 2011/0081218 A1 * | 4/2011 | Wang .................... F16B 5/0208 411/120 |
| 2011/0123291 A1 * | 5/2011 | Chiu .................... F16B 5/0208 411/342 |
| 2011/0302759 A1 | 12/2011 | Chiu |
| 2011/0308065 A1 | 12/2011 | Wang |
| 2012/0099943 A1 * | 4/2012 | Chiu .................... F16B 5/0208 411/347 |
| 2012/0224935 A1 | 9/2012 | Chiu |
| 2012/0237315 A1 | 9/2012 | Chiu |
| 2012/0237316 A1 | 9/2012 | Chiu |

* cited by examiner

FLOATING FASTENER MOUNTING STRUCTURE

This application is a Continuation-In-Part of co-pending application Ser. No. 14/614,983, filed on Feb. 5, 2015, which is a Continuation of application Ser. No. 13/607,759, filed on Sep. 9, 2012, now abandoned, for which priority is claimed under 35 U.S.C. §120, the entire contents of which are hereby incorporated by reference.

BACKGROUND OF THE INVENTION

1. Field of the Invention

The present invention relates to floating fastener mounting technology and more particularly, to a floating fastener mounting structure comprised of a mounting socket, a locking member, a spring member, a cap member and a metal panel member, which enhances the strength of the connected structure between the mounting socket and the metal panel member by means of inserting the mounting socket upwardly inserted with the cap member through a mounting through hole of the metal panel member to let a stop flange of the mounting socket be stopped at the bottom wall of the metal panel member, and using a stamping press to stamp the metal panel member, the mounting socket and the cap member, deforming the peripheral wall of the mounting through hole into a riveting portion and simultaneously forcing the riveting portion thus formed into engagement with an annular locating groove of the mounting socket, and thus, the metal panel member and the mounting socket are firmly secured together and prohibited from separation.

2. Description of the Related Art

When joining metal panel members, fastening devices respectively formed of a lock screw, a rotary knob and a washer may be used. During application, the lock screw, rotary knob and washer of each fastening device are assembled and then mounted at a first metal panel member. When fastening the first metal panel member to a second metal panel member, rotate the rotary knob of each fastening device to drive the respective lock screw into a respective mounting screw hole at the second metal panel member, and then use a hand tool to fasten tight the lock screw. This multiple metal panel member fastening method can be used in a machine tool or other situations where multiple metal panel members are to be fastened in a stack. In a machine tool, the location where metal panel members are fastened together may be at the power drive or speed-adjustment unit inside the housing. The lock screws of the fastening devices may fall from the metal panel members and missed easily due to user's negligence during a metal panel member dismounting procedure for the performance of a repair or speed adjustment operation, affecting further re-installation operation.

In order to eliminate the aforesaid problem, floating fasteners formed of a cap member, a locking screw, a spring member and a mounting socket are created. In application, the mounting socket is affixed to a metal panel member; the locking screw is inserted through the mounting socket; the spring member is mounted around the locking screw and stopped between the head of the locking screw and an inside wall of the mounting socket; the cap member is affixed to the head of the locking member and axially slidably coupled to the mounting socket. For example, FIG. 9 illustrates a floating fastener according to the prior art. According to this design, the floating fastener comprises a mounting socket A that comprises a bottom mounting portion A1 inserted into a mounting through hole B0 at a metal panel member B and welded thereto, a lock screw C1 inserted through a center hole A0 of the mounting socket A, a spring member C11 mounted around the shank of the lock screw C1 and stopped between an inside step A3 in the center hole A0 of the mounting socket A and the head of the lock screw C1 to floatably support the lock screw C1 in the mounting socket A, and a cap member C affixed to the head of the lock screw C1 and having an inside coupling flange C2 protruded from the inner perimeter thereof at a bottom side and slidably coupled to the outer perimeter of the mounting socket A between an external top annular flange A2 and an stop flange A11 of the mounting socket A. The bottom mounting portion A1 of the mounting socket A is inserted into the mounting through hole B0 of metal panel member B and attached to a solder paste B1 at the top wall of the metal panel member B around the mounting through hole B0 and then welded thereto through reflow soldering. Due to limited contact surface area between the mounting socket A and the metal panel member B, the structural strength between the mounting socket A and the metal panel member B is not strong enough, and the bottom mounting portion A1 of the mounting socket A may break easily when the mounting socket A is stretched accidentally by an external force. Further, when coupling the inside coupling flange C2 of the cap member C to the outer perimeter of the mounting socket A between an external top annular flange A2 and an stop flange A11 of the mounting socket A, the applied force may stretch the mounting socket A, loosening the mounting socket A or even forcing the mounting socket A out of place.

In order to eliminate the drawbacks of the prior art floating fastener shown in FIG. 9, an improved design is created, as shown in FIG. 10. According to this improved design, the mounting socket A is riveted to the metal panel member B. As illustrated, the bottom mounting portion A1 of the mounting socket A is a stub tube A12 downwardly inserted into the mounting through hole B0 of the metal panel member B. After riveting, the peripheral wall of the mounting through hole B0 of metal panel member B is deformed and engaged into an annular groove A121 around the stub tube A12 to fixedly secure the mounting socket A to the metal panel member B. According to this design, the outer diameter of the mounting socket A is larger than the outer diameter of the stub tube A12 of the bottom mounting portion A1. When mounting the cap member C on the mounting socket A, the mounting socket A can easily be biased to force the bottom mounting portion A1 out of the mounting through hole B0 of the metal panel member B.

Therefore, there is a strong demand for a floating fastener mounting structure that eliminates the drawbacks of the aforesaid prior art designs.

SUMMARY OF THE INVENTION

The present invention has been accomplished under the circumstances in view. It is therefore the main object of the present invention to provide a floating fastener mounting structure, which comprises a metal panel member, a mounting socket affixed to the metal panel member, a locking member mounted in the mounting socket and insertable into a locating hole in an external metal panel member to lock the metal panel member to the external metal panel member, and a spring member mounted in the mounting socket to floatably support the locking member in the mounting socket. The mounting socket comprises a center hole vertically extending through opposing top and bottom surfaces thereof, an annular step extended around the periphery thereof at a selected elevation, a stop flange extended around the periphery thereof in flush with the bottom surface of the mounting socket, and a locating groove extended around the periphery thereof between the annular step and said stop flange. Further, the outer diameter of the stop flange is larger than the outer diameter of the annular step. The locking member comprises a shank inserted through the center hole of the mounting socket, a mounting head located at a top end of the shank and extended out of the top surface of the mounting socket, and an expanded locking end tip located at an opposing bottom end of the shank. The spring member is mounted around the shank of the locking member and stopped between a part of the mounting socket and a part of the locking member. The cap member is affixed to said mounting head of the locking member, comprising an accommodation chamber that accommodates a part of the mounting socket and a part of the locking member. Further, the outer diameter of the cap member is equal to or smaller than the outer diameter of the annular step of the mounting socket. The metal panel member comprises a mounting through hole cut through opposing top and bottom surfaces thereof for the insertion of the mounting socket and the cap member therethrough, and a riveting portion formed of a part of the metal panel member around the mounting through hole by stamping and engaged into the annular locating groove of the locking member and wrapped about the stop flange of the mounting socket to affix the mounting socket to the metal panel member. By means of riveting the mounting socket to the metal panel member, the floating fastener mounting structure has high shearing strength.

Further, when fasten the mounting socket and the metal panel member together, attach a negative mold cavity of a stamping die to the annular step of the mounting socket and the cap member to stop a front planar die surface of the stamping die at the top surface of the metal panel member around the mounting through hole, and then operate the stamping press to stamp the negative mold cavity of the stamping die onto the mounting socket and the cap member, causing the front planar die surface of the stamping die around the negative mold cavity to deform a part of the metal panel member around the mounting through hole into a riveting portion and to simultaneously force the riveting portion thus formed into engagement with the annular locating groove of the mounting socket and tightly stopped between the flat bottom stop surface of the annular step and the stop flange. Thus, the deformed riveting portion of the metal panel member is wrapped about the stop flange of the mounting socket to enhance the structural strength of the connection between the mounting socket and the metal panel member. Even if the mounting socket is pulled or forced by an external force after its fixation to the metal panel member, the mounting socket will not fall out of the metal panel member, assuring a high level of structural stability and shear strength.

Further, when fastening the mounting head of the locking member and the mating connection portion of the cap member, insert the positioning rod of the mounting head of the locking member into the mounting hole of the mating connection portion of the cap member, and then impart a pressure to the cap member to move an engagement flange of the cap member along over a retaining flange of the mounting head of the locking member so that the engagement flange can be engaged into a position-limit groove around the positioning rod and between the retaining flange and shank of the locking member. Further, the cap member can be made from a plastic material in any desired color and shape, and configured to provide a pattern or mark. In actual application, the cap member and the locking member can be modularized for quick connection in a detachable manner, and respectively marked with a mark for installation alignment.

DETAILED DESCRIPTION OF THE PREFERRED EMBODIMENT

Figure 1:
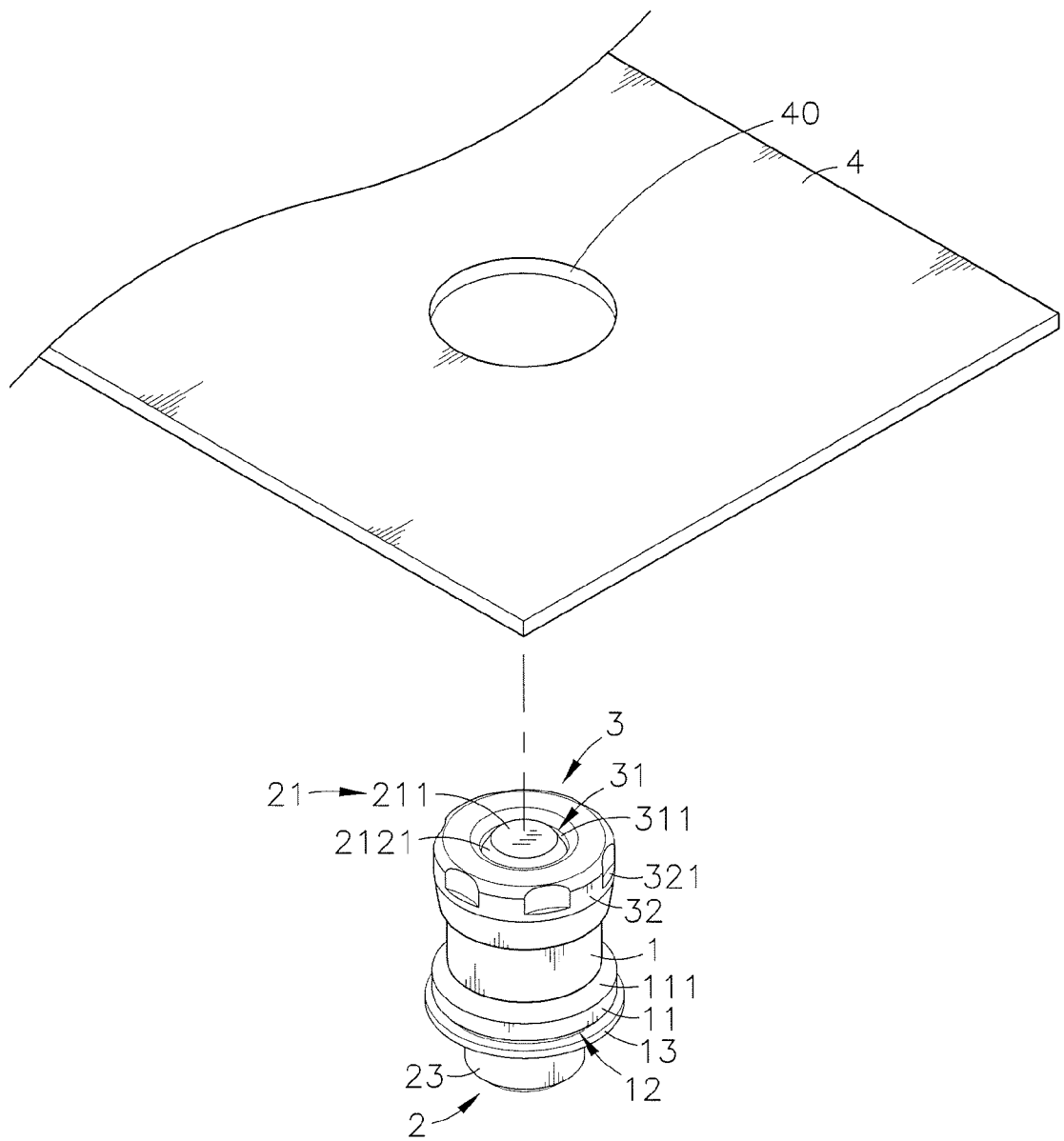
FIG. 1 is an exploded view of a floating fastener mounting structure in accordance with the present invention.
Figure 2:
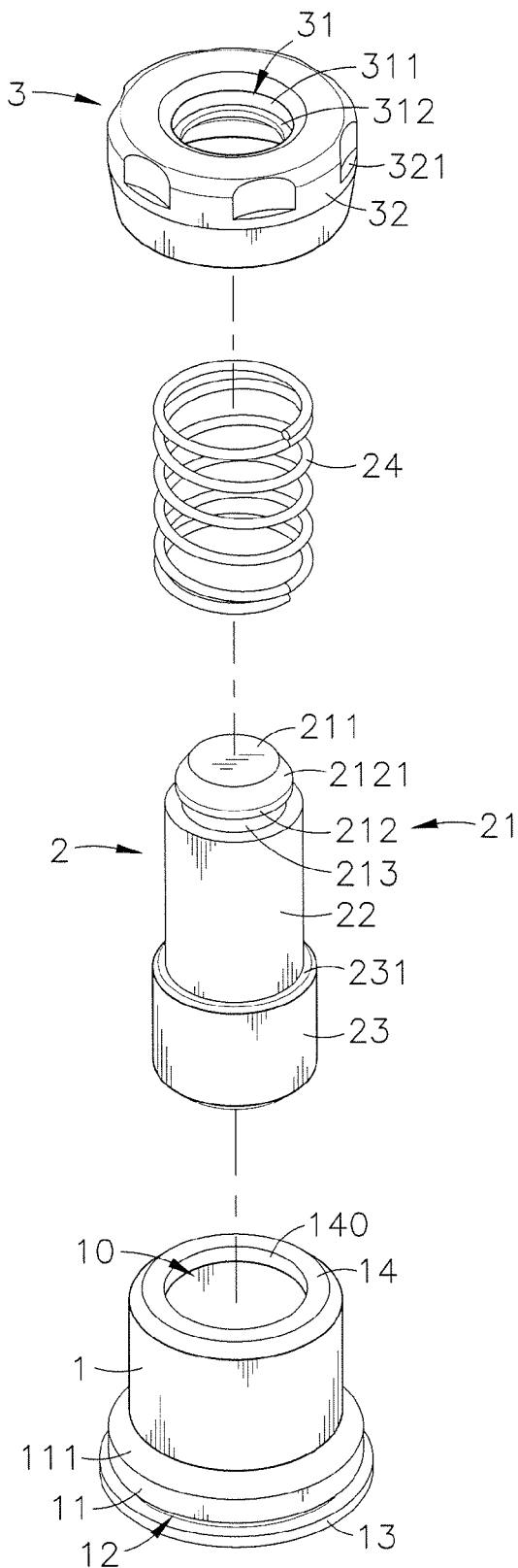
FIG. 2 is an exploded view of the floating fastener in accordance with the present invention.
Figure 3:
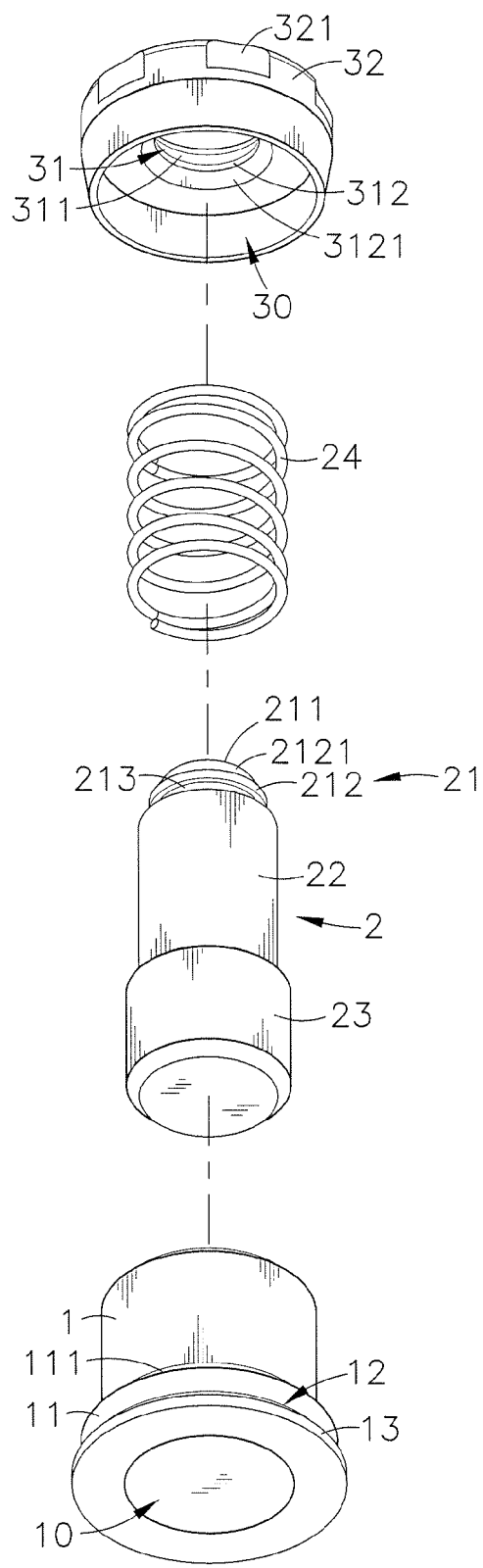
FIG. 3 corresponds to FIG. 2 when viewed from another angle.
Figure 4:
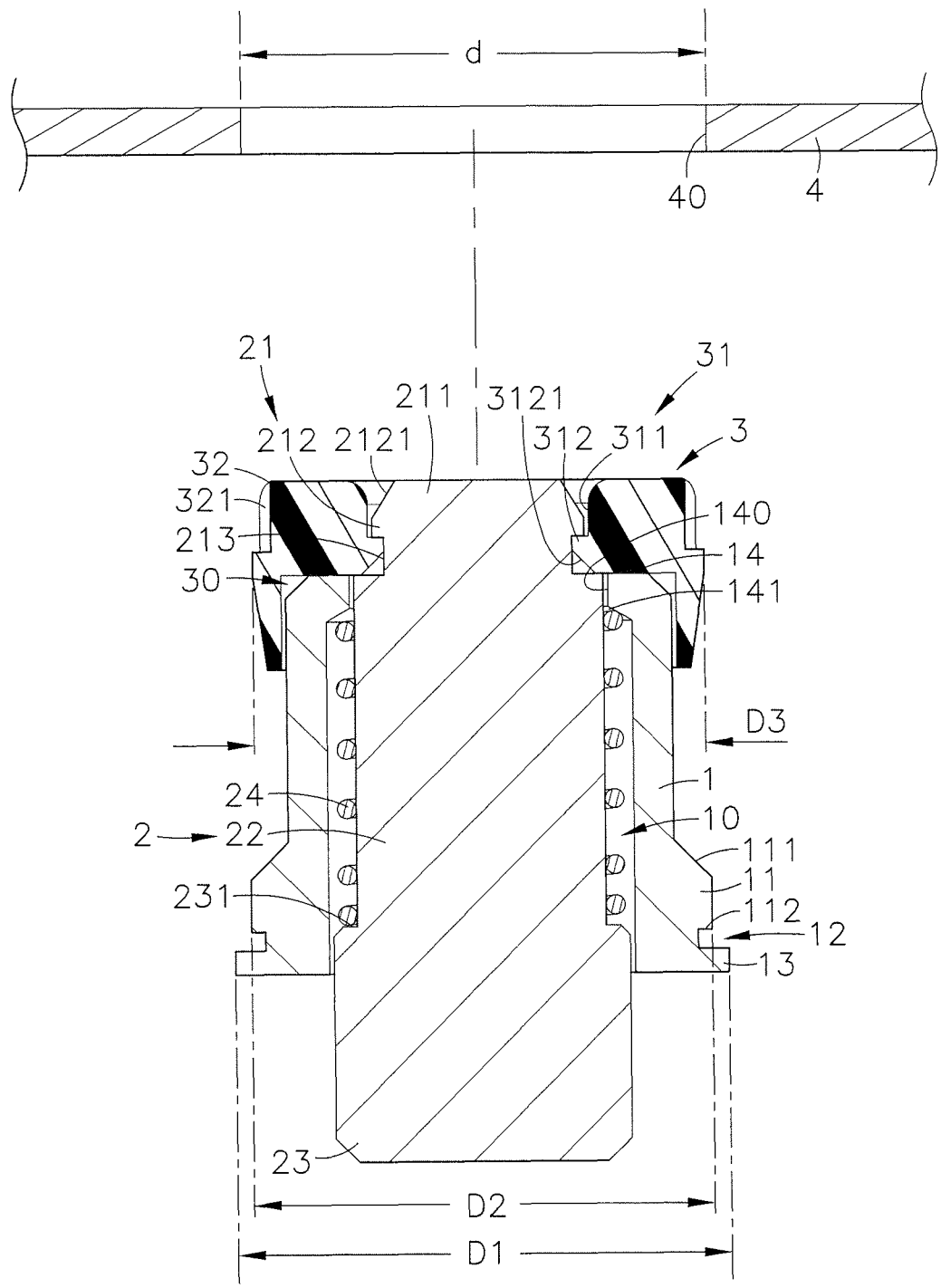
FIG. 4 is an exploded sectional view of the floating fastener mounting structure in accordance with the present invention.

Referring to FIGS. 1-4, a floating fastener mounting structure in accordance with the present invention is shown. The floating fastener mounting structure comprises a mounting socket 1, a locking member 2, a spring member 24, a cap member 3, and a metal panel member 4.

The mounting socket 1 is an open-ended cylindrical member comprising a center hole 10 vertically extending through opposing top and bottom sides thereof, an annular step 11 extended around the outer perimeter thereof at a selected elevation and defining a downwardly and outwardly sloping top surface 111 and a flat bottom stop surface 112, a stop flange 13 extended around the outer perimeter in flush with the bottom surface of the mounting socket 1, a locating groove 12 extended around the outer perimeter between the annular step 11 and the stop flange 13, and an annular inner top flange 14 located at a top side of the center hole 10 and defining a bottom abutment surface 141 and a center opening 140 in a concentric manner relative to the center hole 10. The outer diameter D1 of the stop flange 13 is larger than the outer diameter D2 of the annular step 11.

The locking member 2 comprises a shank 22 inserted through the center hole 10 and center opening 140 of the mounting socket 1, a mounting head 21 located at a top end of the shank 22 and extended out of the top side of the mounting socket 1, an expanded locking end tip 23 located at an opposing bottom end of the shank 22, and a bearing step 231 defined in a top side of the expanded locking end tip 23 around the bottom end of the shank 22. The mounting head 21 comprises a positioning rod 211, a retaining flange 212 extending around the periphery of the positioning rod 211 and defining a chamfered edge 2121 that slopes downwardly outward, and a position-limit groove 213 extending around the positioning rod 211 between the chamfered edge 2121 of the retaining flange 212 and the shank 22.

In this embodiment, the expanded locking end tip 23 is shaped like a cylindrical block. Alternatively, the expanded locking end tip 23 can be configured to provide an outer thread or retaining flange.

The spring member 24 is mounted around the shank 22 of the locking member 2 and stopped between the bottom abutment surface 141 of the mounting socket 1 and the bearing step 231 of the locking member 2.

The cap member 3 comprises an accommodation chamber 30 for accommodating a part of the mounting socket 1 and a part of the locking member 2, a mating connection portion 31 located in a top side of the accommodation chamber 30 for securing the mounting head 21, a mounting hole 311 vertically cut through the center of the mating connection portion 31 in communication with the accommodation chamber 30, an engagement flange 312 located in the mating connection portion 31 and projecting into the mounting hole 311, a sloping guide surface 3121 located at a bottom side of the engagement flange 312, and an operating portion 32 extending around the mating connection portion 31, and a plurality of grooves 321 located in and spaced around the operating portion 32. Further, the outer diameter D3 of the cap member 3 is not larger than (i.e., equal to or smaller than) the outer diameter D2 of the annular step 11.

The metal panel member 4 comprises at least one mounting through hole 40. The inner diameter D of the at least one mounting through hole 40 of the metal panel member 4 is in the range between the outer diameter D1 of the stop flange 13 and the outer diameter D2 of the annular step 11. In this embodiment, the inner diameter D of the at least one mounting through hole 40 is slightly larger than the outer diameter D2 of the annular step 11 and smaller than the outer diameter D1 of the stop flange 13.

During installation, sleeve the spring member 24 onto the shank 22 of the locking member 2, and then insert the mounting head 21 upwardly through the center hole 10 of the mounting socket 1 and the center opening 140 of the annular inner top flange 14 to let one end of the spring member 24 stopped at the bottom abutment surface 141 of the annular inner top flange 14 and the other end of the spring member 24 stopped at the bearing step 231 of the expanded locking end tip 23, and then insert the positioning rod 211 of the mounting head 21 upwardly into the accommodation chamber 30 of the cap member 3 and the mounting hole 311 of the mating connection portion 31 to abut the chamfered edge 2121 of the retaining flange 212 against the sloping guide surface 3121 of the engagement flange 312, and then impart a downward pressure to the cap member 3 to force the engagement flange 312 against the retaining flange 212 and to further elastically deform the engagement flange 312 and move the engagement flange 312 along the chamfered edge 2121 over the retaining flange 212 so that the engagement flange 312 can be engaged into the position-limit groove 213 after restoration to its original shape. At this time, the elastic restoring force of the spring member 24 is transferred to the bearing step 231 of the expanded locking end tip 23 to force the expanded locking end tip 23 to move to the outside of the stop flange 13 of the mounting socket 1. When the expanded locking end tip 23 is forced to move to the outside of the stop flange 13 of the mounting socket 1, the cap member 3 is moved downwards with the mounting head 21 of the locking member 2 to stop at the mounting socket 1, and thus, the mounting socket 1, the locking member 2 and the cap member 3 are floatably fastened together. Further, the cap member 3 can be made from a plastic material in any desired color and shape, and configured to provide a pattern or mark. In actual application, the cap member 3 and the locking member 2 can be modularized for quick connection in a detachable manner, and respectively marked with a mark for installation alignment.

Figure 5:
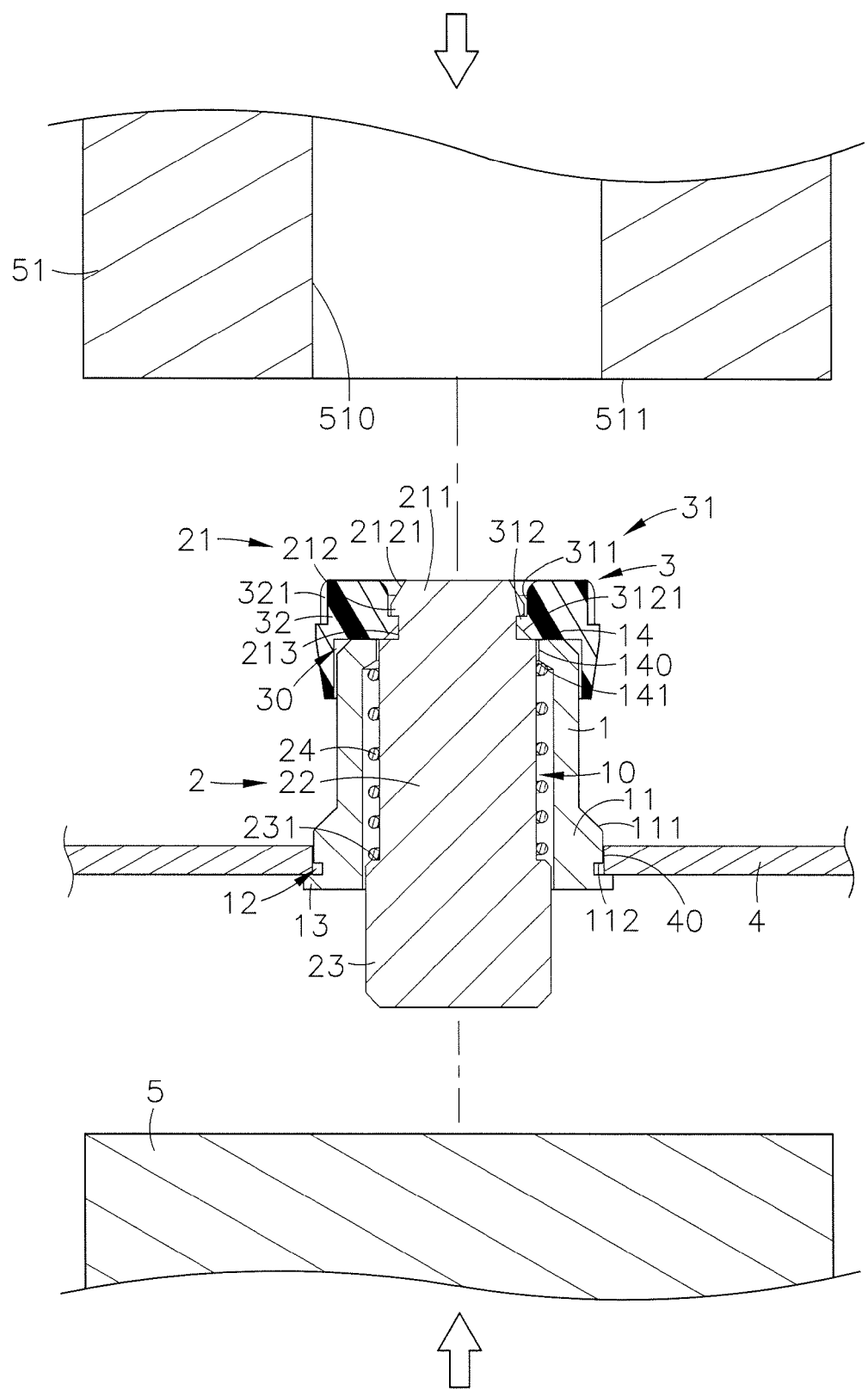
FIG. 5 is a schematic sectional view illustrating the riveting process of the floating fastener mounting structure in accordance with the present invention in a stamping press (I).
Figure 6:
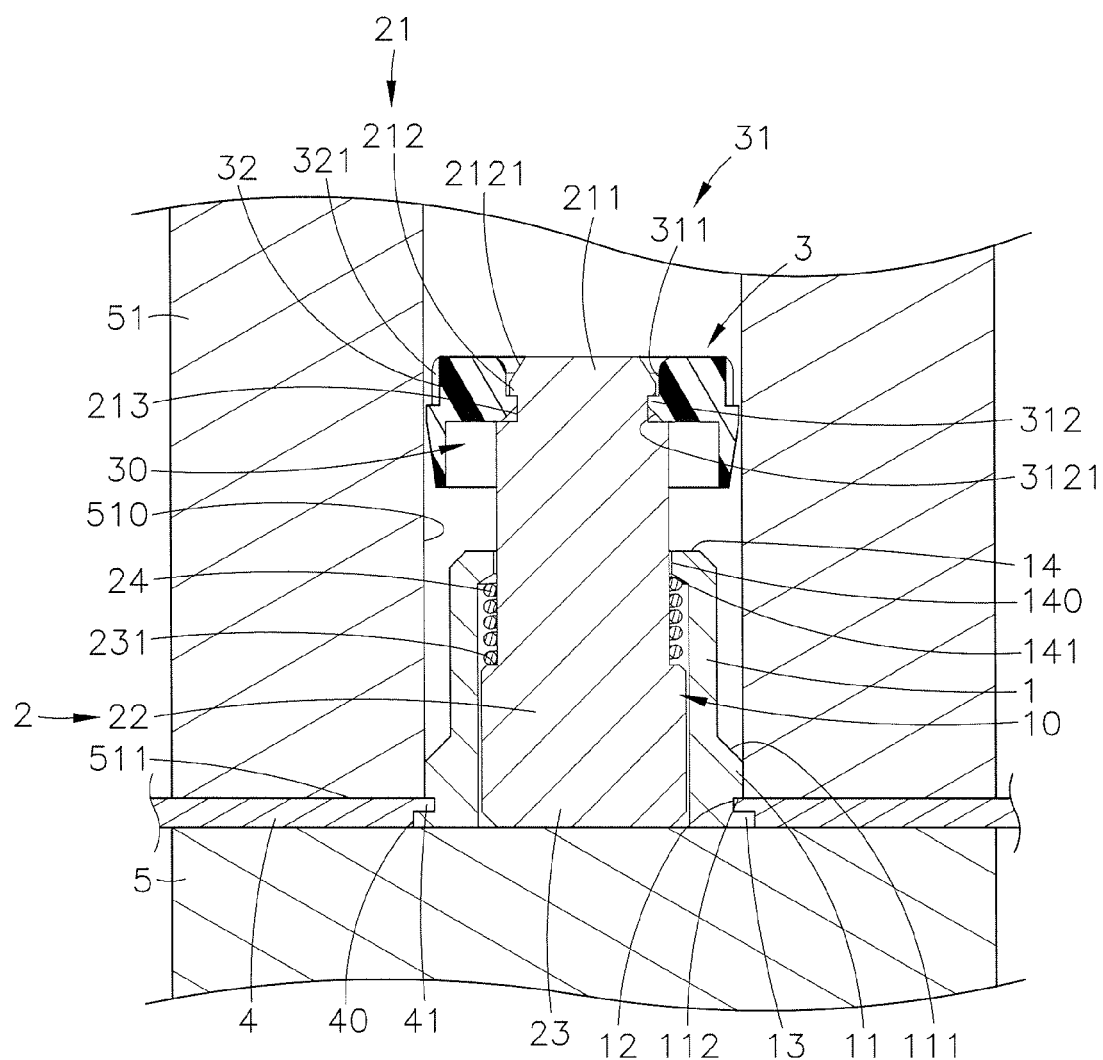
FIG. 6 is a schematic sectional view illustrating the riveting process of the floating fastener mounting structure in accordance with the present invention in a stamping press (II)
Figure 7:
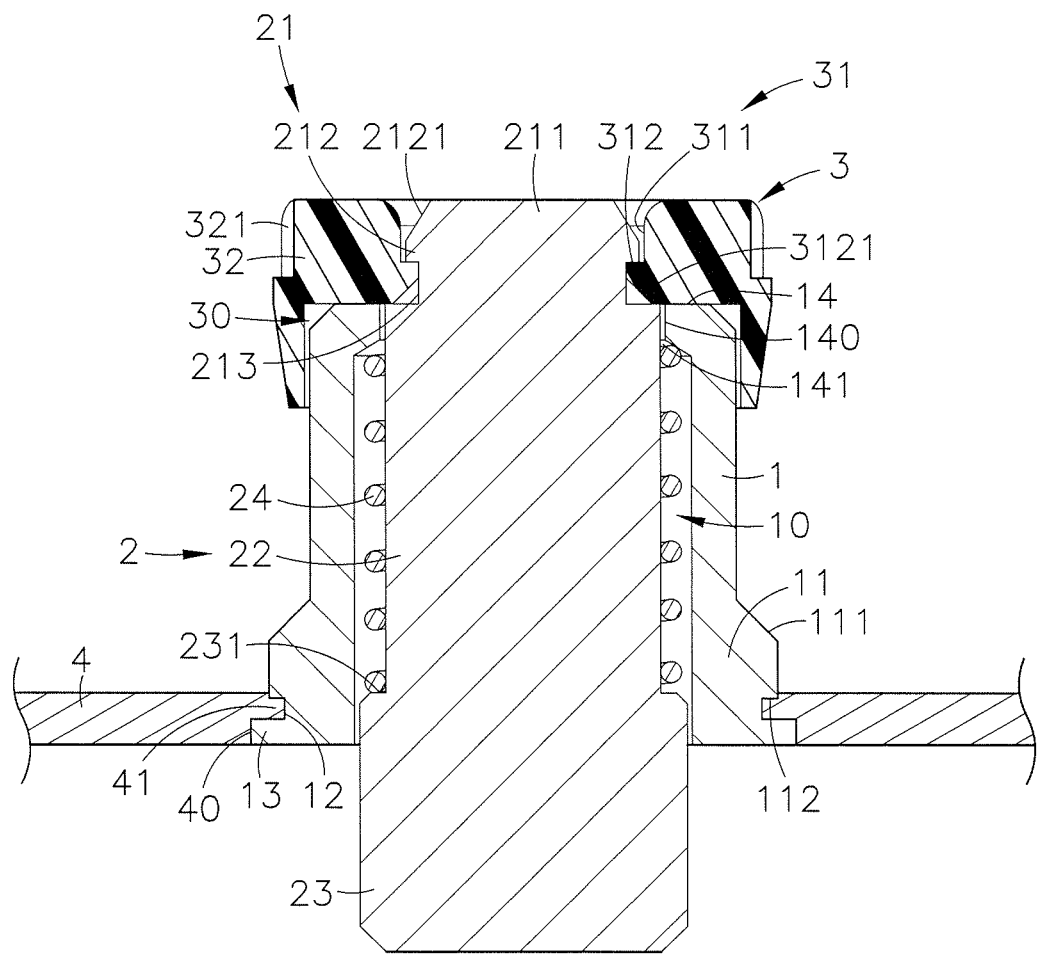
FIG. 7 is a sectional view of the floating fastener mounting structure after the riveting process in accordance with the present invention.
Figure 8:
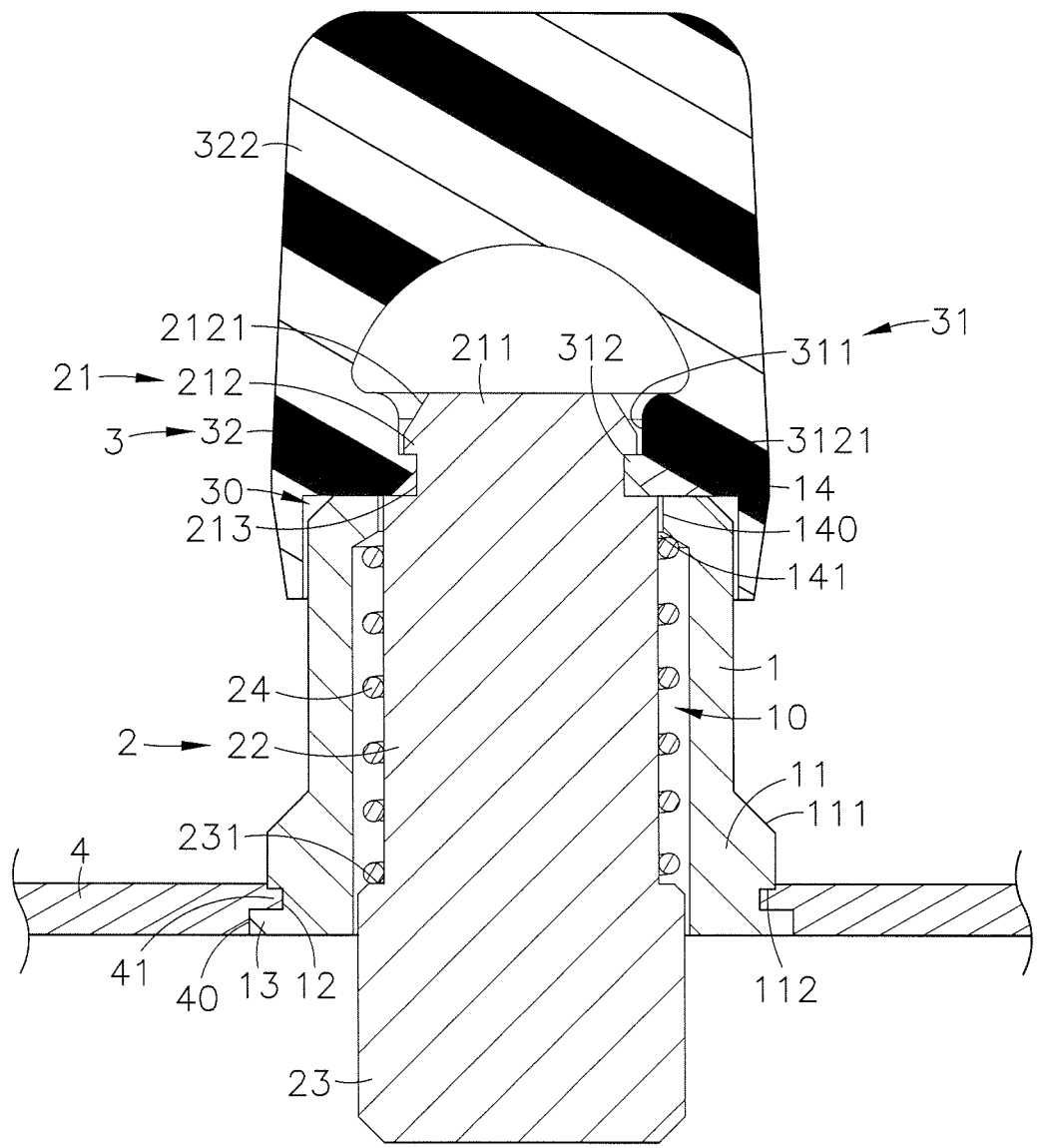
FIG. 8 is sectional side view, in an enlarged scale, of a part of an alternate form of the present invention, illustrating a grip located at the operating portion of the cap member.
Figure 9:
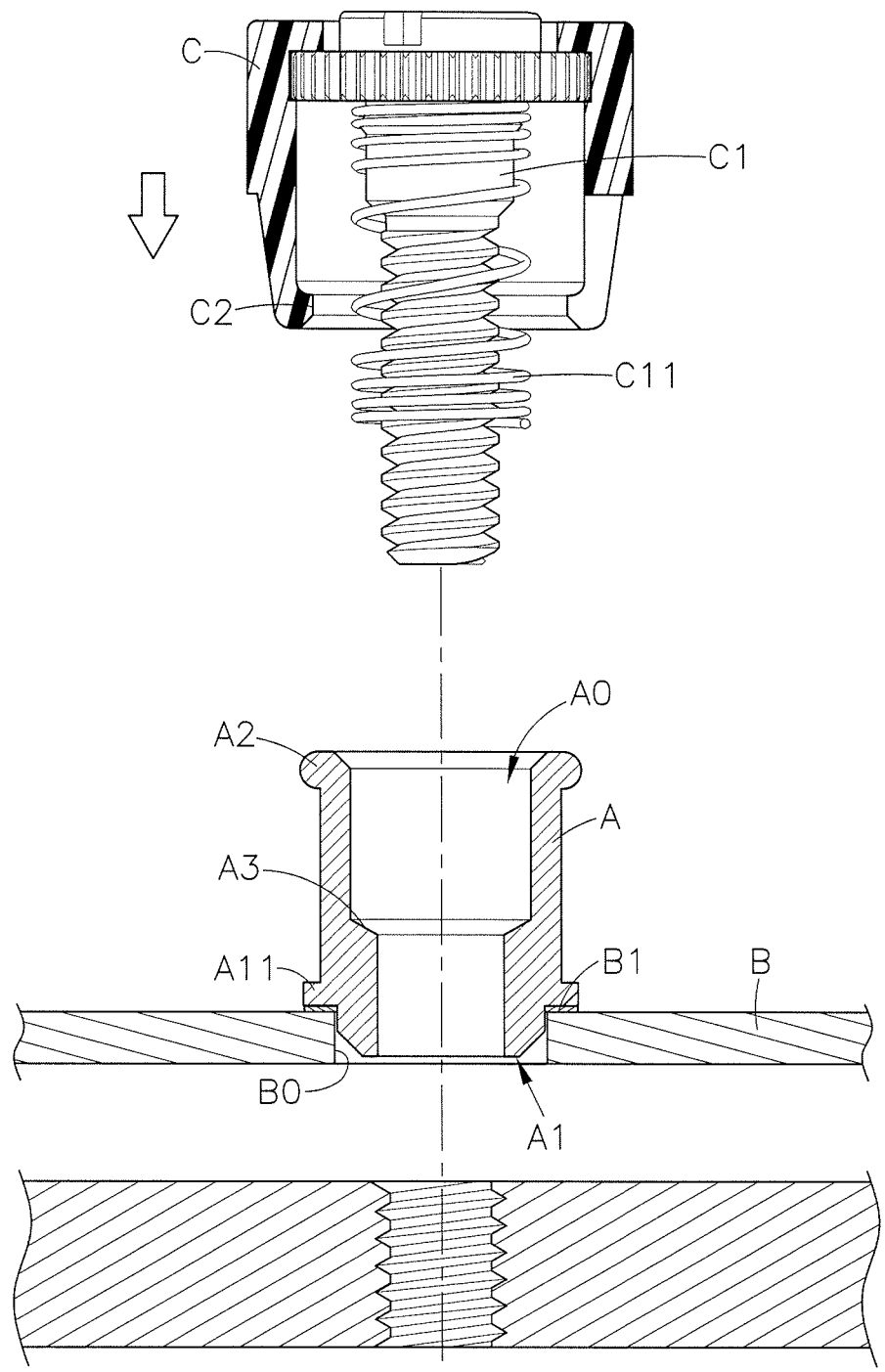
FIG. 9 is a sectional exploded view of a floating fastener mounting structure according to the prior art.
Figure 10:
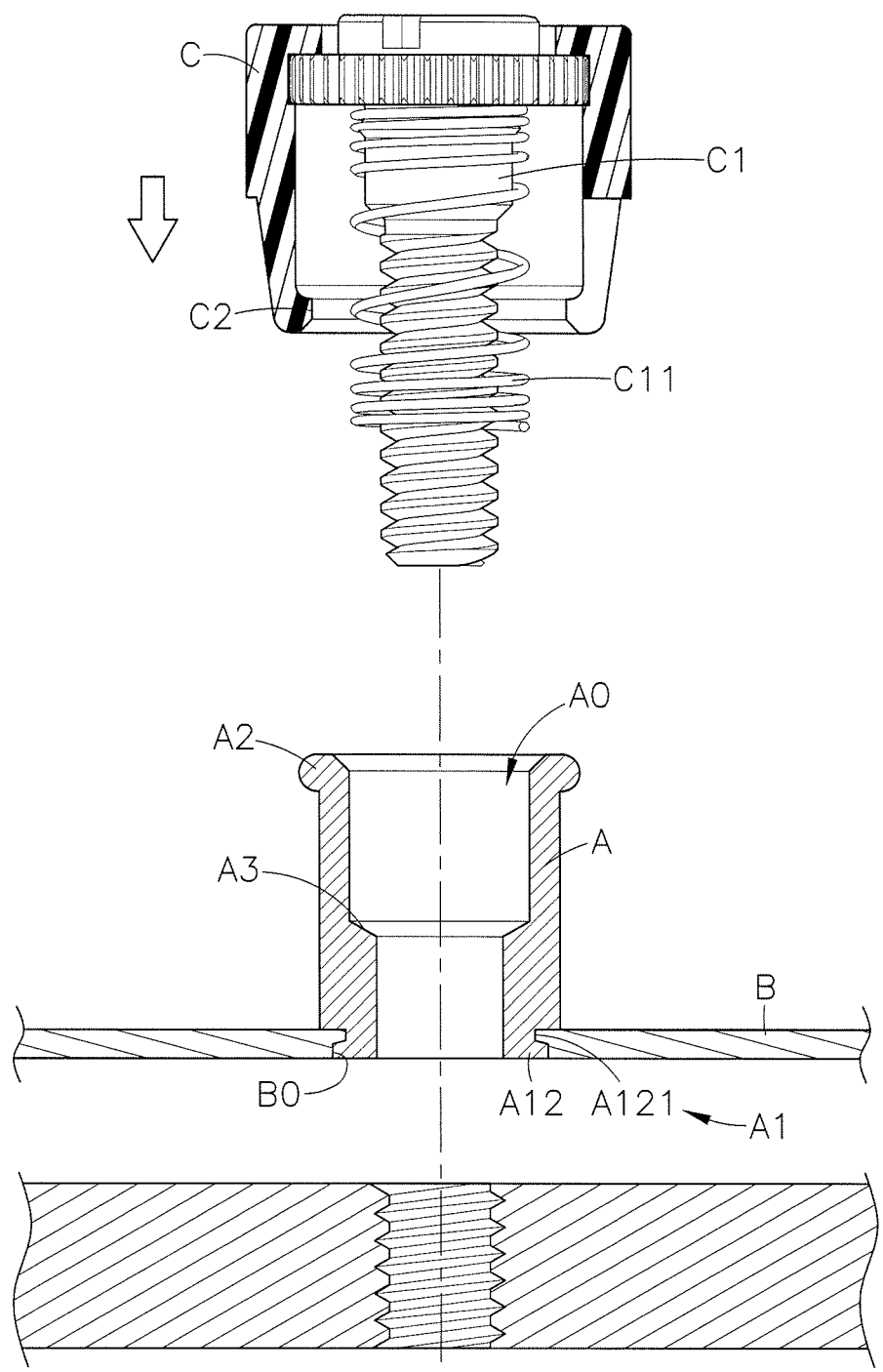
FIG. 10 is a sectional exploded view of another design of floating fastener mounting structure according to the prior art.

Referring to FIGS. 5-8, when mounting the mounting socket 1 in the metal panel member 4, insert the mounting socket 1 upwardly into the mounting through hole 40 of the metal panel member 4. Because the outer diameter D3 of the cap member 3 and the outer diameter D2 of the annular step 11 of the mounting socket 1 are equal to or smaller than the inner diameter D of the mounting through hole 40, the cap member 3 can move through the mounting through hole 40 smoothly. Further, because the outer diameter D1 of the stop flange 13 is larger than the outer diameter D2 of the annular step 11 and the inner diameter D of the mounting through hole 40, the mounting through hole 40 of the metal panel member 4 can be moved downwardly along the outwardly sloping top surface 111 of the annular step 11 and temporarily stopped at the stop flange 13. Therefore, the mounting socket 1 and the metal panel member 4 are placed on a worktable 5 of a stamping press for the implementation of a stamping process.

In the stamping process to affix the mounting socket 1 and the metal panel member 4 together, attach a negative mold cavity 510 of a stamping die 51 to the annular step 11 of the mounting socket 1 and the cap member 3 to stop a front planar die surface 511 of the stamping die 51 around the negative mold cavity 510 at the top surface of the metal panel member 4 around the mounting through hole 40, and then operate the stamping press to stamp the negative mold cavity 510 of the stamping die 31 onto the mounting socket 1 and the cap member 3, causing the front planar die surface 511 of the stamping die 51 around the negative mold cavity 510 to deform a part of the metal panel member 4 around the mounting through hole 40 into a riveting portion 41 and to simultaneously force the riveting portion 41 thus formed into engagement with the annular locating groove 12 of the mounting socket 1 and tightly stopped between the flat bottom stop surface 112 of the annular step 11 and the stop flange 131. Thus, the deformed riveting portion 41 of the metal panel member 4 is wrapped about the stop flange 13 of the mounting socket 1 to enhance the structural strength of the connection between the mounting socket 1 and the metal panel member 4. Further, because the outer diameter D1 of the stop flange 13 is larger than the outer diameter D2 of the annular step 11, the metal panel member 4 and the mounting socket 1 are firmly secured together and prohibited from separation. Even if the mounting socket 1 is pulled or forced by an external force, the mounting socket 1 will not fall out of the metal panel member 4, assuring a high level of structural stability and shear strength.

Further, by means of the grooves 321 in the operating portion 32 of the cap member 3, the cap member 3 can be conveniently and positively pulled to lift the locking member 2, retracting the expanded locking end tip 23 into the inside of the center hole 10 of the mounting socket 1 and forcing the bearing step 231 of the expanded locking end tip 23 to compress the spring member 24. At this time, the metal panel member 4 can be attached to a second metal panel member (not shown) to keep the mounting through hole 40 in vertical alignment with a locating hole in the second metal panel member, and then release the pulling force from the operating portion 32 of the cap member 3, enabling the locking member 2 to be forced by the elastic restoring force of the spring member 24 out of the mounting socket 1 and the mounting through hole 40 of the metal panel member 4 to engage the expanded locking end tip 23 into the locating hole of the second metal panel member, and thus, the metal panel member 4 is locked to the second metal panel member. Further, the user can pull the cap member 3 to lift the locking member 2, moving the expanded locking end tip 23 upwardly to unlock the metal panel member 4 from the second metal panel member. Further, the structure of the operating portion 32 of the cap member 3 can be variously designed. For example, a grip 322 of diameter smaller than the outer diameter D3 of the cap member 3 can be made at the operating portion 32.

In conclusion, the invention provides a floating fastener mounting structure that comprises a metal panel member 4, a mounting socket 1 affixed to the metal panel member 4, a spring member 24, a locking member 2 supported on the spring member 24 in the mounting socket 1 and adapted for locking the metal panel member 4 to an external metal panel member, and a cap member 3 capped on the top end of the locking member 2 and disposed at the top side relative to the mounting socket 1, wherein the mounting socket 1 is configured to provide a center hole 10, an annular inner top flange 14, an annular step 11 of relatively smaller outer diameter extended around the outer perimeter thereof, a stop flange 13 of relatively larger outer diameter extended around the outer perimeter in flush with the bottom surface of the mounting socket 1, and a locating groove 12 extended around the outer perimeter between the annular step 11 and the stop flange 13; the locking member 2 comprises a shank 22 inserted through the center hole 10 of the mounting socket 1, a mounting head 21 located at a top end of the shank 22 and extended out of the top side of the mounting socket 1 and affixed to the cap member 3, an expanded locking end tip 23 located at an opposing bottom end of the shank 22, and a bearing step 231 defined in a top side of the expanded locking end tip 23 around the bottom end of the shank 22; the spring member 24 is mounted around the shank 22 of the locking member 2 and stopped between the bearing step 231 of the locking member 2 and the annular inner top flange 14 of the mounting socket 1. The mounting socket 1 is upwardly inserted with the cap member 3 through a mounting through hole 40 of the metal panel member 4 to let the stop flange 13 be stopped at the bottom wall of the metal panel member 4, and then the metal panel member 4 with the mounting socket 1 and the cap member 3 are stamped in a stamping press, causing a part of the metal panel member 4 around the mounting through hole 40 to be elastically deformed. Thus, the peripheral wall of the mounting through hole 40 is deformed to provide a riveting portion 41 that is forced into engagement with the annular locating groove 12 of the mounting socket 1 and tightly stopped between the flat bottom stop surface 112 of the annular step 11 and the stop flange 131. Thus, the metal panel member 4 and the mounting socket 1 are firmly secured together and prohibited from separation. Even if the mounting socket 1 is pulled or forced by an external force, the mounting socket 1 will not fall out of the metal panel member 4, assuring a high level of structural stability and shear strength.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A floating fastener mounting structure, comprising a metal panel member, a mounting socket affixed to said metal panel member, a locking member mounted in said mounting socket and insertable into a locating hole in an external metal panel member to lock said metal panel member to said external metal panel member, and a spring member mounted in said mounting socket to floatably support said locking member in said mounting socket, wherein:

said mounting socket comprising a center hole vertically extending through opposing top and bottom surfaces thereof, an annular step extended around the periphery thereof at a selected elevation, a stop flange extended around the periphery thereof in flush with the bottom surface of said mounting socket, and a locating groove extended around the periphery thereof between said annular step and said stop flange, the outer diameter of said stop flange being larger than the outer diameter of said annular step;

said locking member comprising a shank inserted through the center hole of said mounting socket, a mounting head located at a top end of said shank and extended out of the top surface of said mounting socket, and an expanded locking end tip located at an opposing bottom end of said shank;

said spring member is mounted around said shank of said locking member and stopped between a part of said mounting socket and a part of said locking member;

said cap member is affixed to said mounting head of said locking member, comprising an accommodation chamber that accommodates a part of said mounting socket and a part of said locking member, the outer diameter of said cap member being equal to or smaller than the outer diameter of said annular step of said mounting socket;

said metal panel member comprising a mounting through hole cut through opposing top and bottom surfaces thereof for the insertion of said mounting socket and said cap member therethrough, and a riveting portion formed of a part of said metal panel member around said mounting through hole by stamping and engaged into said annular locating groove of said locking member and wrapped about said stop flange of said mounting socket to affix said mounting socket to said metal panel member.

2. The floating fastener mounting structure as claimed in claim 1, wherein said annular step of said mounting socket defines a downwardly and outwardly sloping top surface located at a top side thereof for guiding said riveting portion of said metal panel member into engagement with said annular locating groove of said mounting socket.

3. The floating fastener mounting structure as claimed in claim 1, wherein said annular step of said mounting socket defines a flat bottom stop surface annular locating groove located at a bottom side thereof and abutted against a top surface of said riveting portion of said metal panel member in said annular locating groove of said mounting socket.

4. The floating fastener mounting structure as claimed in claim 1, wherein said mounting socket further comprises an annular inner top flange located at a top side of said center hole, said inner top flange defining therein a center opening in a concentric manner relative to said center hole for the passing of said mounting head of said locking member and a bottom abutment surface adapted for stopping a top end of said spring member.

5. The floating fastener mounting structure as claimed in claim 1, wherein said mounting head of said locking member comprises a positioning rod, a retaining flange extending around the periphery of said positioning rod and defining a chamfered edge that slopes downwardly outward, and a position-limit groove extending around said positioning rod between said chamfered edge of said retaining flange and said shank; said cap member further comprises a mating connection portion located in a top side of said accommodation chamber for securing said mounting head of said locking member, a mounting hole vertically cut through the center of said mating connection portion in communication with said accommodation chamber for the passing of said positioning rod of said mounting head of said locking member, and an engagement flange located in said mating connection portion and engaged into said position-limit groove said mounting head of said locking member.

6. The floating fastener mounting structure as claimed in claim 1, wherein said locking member further comprises a bearing step defined in a top side of said expanded locking end tip around the bottom end of said shank adapted for stopping a bottom end of said spring member.

7. The floating fastener mounting structure as claimed in claim 1, wherein said cap member further comprises an operating portion located at a top side thereof around said accommodation chamber, and a plurality of grooves located in and spaced around said operating portion; the outer diameter of said cap member is equal to or smaller than the outer diameter of said annular step of said mounting socket.

8. The floating fastener mounting structure as claimed in claim 1, wherein said cap member further comprises an operating portion located at a top side thereof around said accommodation chamber, and a grip located at said operating portion, the outer diameter of said grip being smaller than the outer diameter of said cap member; the outer diameter of said cap member is equal to or smaller than the outer diameter of said annular step of said mounting socket.

* * * * *